July 24, 1923.
L. ROTH
LAMP FIXTURE FOR BEDS AND THE LIKE
Filed Feb. 23, 1921
1,462,498
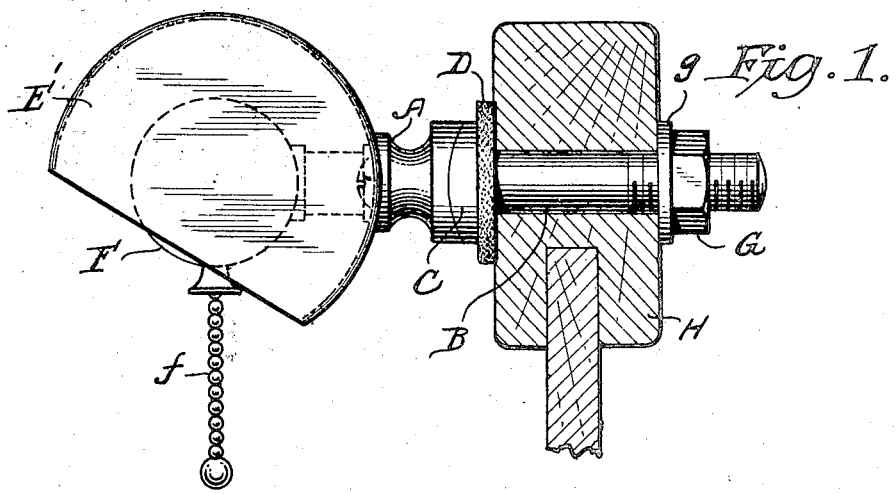
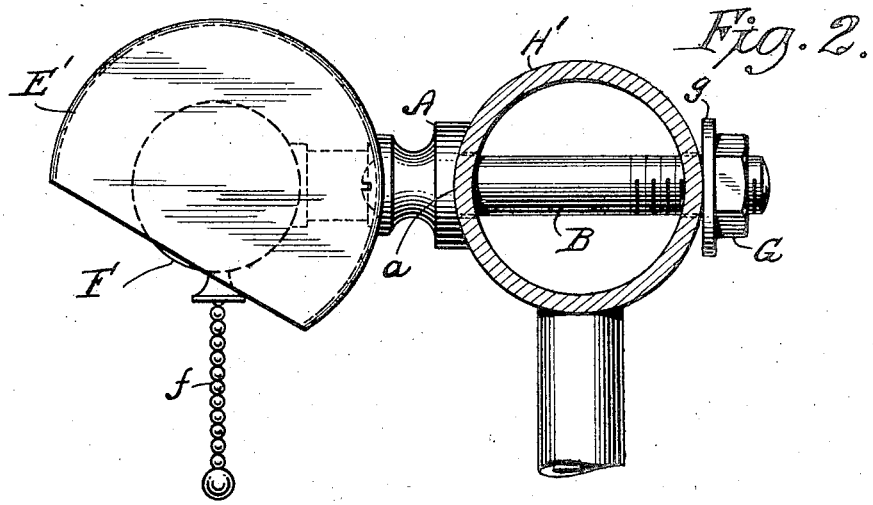
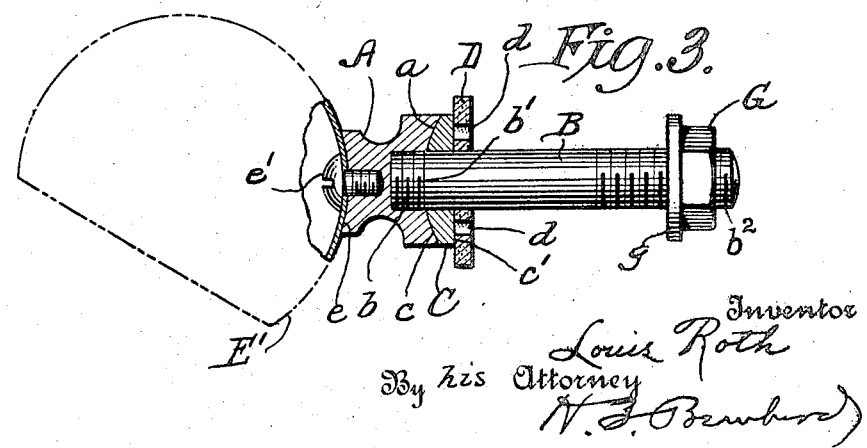
Inventor
Louis Roth
By his Attorney Patented July 24, 1923.                                    1,462,499

UNITED STATES PATENT OFFICE.

PETER THOMSEN, OF CASSEL, GERMANY, ASSIGNOR TO SCHMIDT'SCHE HEISSDAMPF GESELLSCHAFT M. B. H., OF CASSEL-WILHELMSHOHE, GERMANY, A CORPORATION OF GERMANY.

DRAFT-REGULATING DEVICE.

if desired be secured fixedly in position on the member A by means other than the screw $e'$.

An incandescent lamp, indicated by dotted lines at F, is coupled as usual with a socket, not shown, the flow of current to said lamp being controlled by the customary pull switch $f$. Said stem B is provided with a male thread $b^2$ on which is screwed a nut G adapted to be tightened against a washer $g$ whereby the fixture may be clamped against the element H or H' of a bedstead, or other object.

Collar C is composed of metal centrally perforated to slip over the stem B, it being essential in this invention that said collar be provided with a curved face $c$ and a plane face $c'$. The curvature of the face $c$ corresponds to the face $a$ of the head in order that the collar may have a solid bearing against the head, whereby the collar is made available for leveling up the head so as to adapt the fixture for service on plane surfaced bed-elements such as H in Figure 1.

Washer D is composed of rubber, leather, or other compressible material, and it is centrally perforated to fit upon the stem, said washer being interposed between the collar C and the bed element H. The washer is shown as having transverse apertures $d$ presenting air pockets, and when the nut G is screwed home the stem and the head act to compress the washer between the collar C and the bed-element H, whereby the frictional contact of the washer with the collar and the bed-element, aided probably to some extent by the air confined within the pockets $d$, retains the head and the stem so firmly in position that the fixture and the lamp cannot be shifted accidentally out of position nor will the clamping means loosen up to such an extent as to permit undesirable shifting movement of the lamp.

When the fixture is used on a bedstead of the type indicated at H in Figure 1, a hole is produced in the part H, and the collar C and washer D are slipped over the stem, after which the stem is thrust through the hole, washer $g$ is positioned on the stem, and nut G is screwed tightly into place, the effect of which is to compress the washer D between the collar C and the bed-element D and to so tightly clamp the member A and collar C as to preclude the lamp housing from turning out of its operative position.

To adapt the fixture to a curved rail H' of a metal bedstead, the collar C and washer D are dispensed with. A hole having been provided in the bedrail as shown in Figure 2, the stem B is thrust through it for the curved face $a$ of the member A to have contact directly with the bedrail, and thereupon the washer $g$ and nut G are applied to the stem for drawing the curved face $a$ of said member A into such tight contact with the bedrail that the lamp housing cannot be turned accidentally out of the desired position.

It is apparent that the fixture is applied easily and quickly to any kind of bedstead, or other object, and that it is held securely in position.

Having thus fully described the invention, what I claim as new and desire to secure by Letters Patent is:

A lamp-fixture adapted for use on articles of furniture comprising a head one face of which is curved in conformity with the contour of the surface of the article with which said curved face is adapted to contact, a single stem in permanently fixed relation to said head, said stem passing through said curved face only of the head and protruding for a substantial distance beyond said head to afford means for the attachment of said fixture, a perforated collar fitted loosely and removably on the stem, one face of said collar being curved for snug contact with the curved face of the head and the other side of said collar being a plane surface, and means co-operating with the stem for clamping the collar and the head in fixed non-rotative relation to each other and to the article of furniture.

In testimony whereof I have hereto signed my name this 17th day of February, 1921.

LOUIS ROTH.

groups and elements forming separate paths for the gases passing through the respective groups, a draft pipe having branches connected with the respective paths, and a damper located at the junction of the branches and controlling their connection with the main portion of said pipe.

6. In a boiler or the like, a structure having tubes arranged in a plurality of groups and elements forming separate paths for the gases passing through the respective groups, draft devices connected with the respective paths, and means for regulating the effective cross section of said devices, to produce different velocities of the gases travelling through different paths.

7. In combination a boiler having tubes arranged in groups, a smoke box divided into compartments each of which communicates with the tubes of one group, draft devices connected with the respective smoke box compartments, and means for controlling said draft devices.

8. In combination a boiler, having tubes arranged in groups, a smoke box divided into compartments each of which communicates with the tubes of one group, draft devices connected with the respective smoke box compartments, separate stack outlets for each compartment, and means for controlling said draft devices.

9. A boiler having tubes arranged in groups and a smoke box communicating with said tubes, a horizontal partition and a transverse vertical partition which together divide said smoke box into separate compartments communicating with the tubes of the respective groups, draft devices connected with the respective compartments, and means for controlling said draft devices.

10. In combination a boiler having tubes arranged in groups, a smoke box, an upright longitudinal partition which divides said smoke box into separate compartments communicating with the tubes of the respective groups, draft devices connected with the respective compartments, and means for controlling said draft devices.

11. In a boiler or the like, a structure having tubes arranged in a plurality of groups, a chamber divided into separate compartments each communicating with the tubes of one group, draft devices connected with the respective compartments, and selective means whereby any one of said draft devices may be shut off entirely from the respective compartment.

In testimony whereof I have hereunto set my hand.

PETER THOMSEN.

Witnesses:
  Equious Doessloff,
  Max Henze.